INVENTORS.
DON R. HOLCOMB,
DONALD E. HILDRETH,
BY
Walter J. Adam
ATTORNEY.

INVENTORS.
DON R. HOLCOMB,
DONALD E. HILDRETH,
BY
Walter J. Adam
ATTORNEY

INVENTOR.
DON R. HOLCOMB,
DONALD E. HILDRETH,
BY
Walter J. Adams
ATTORNEY.

3,030,582

OPERATIONAL AMPLIFIER HAVING DIRECT CURRENT AMPLIFIER IN WHICH SIGNAL IS CONVERTED TO AND FROM FREQUENCY MODULATION

Don R. Holcomb, Los Angeles, and Donald E. Hildreth, Redondo Beach, Calif., assignors to Hughes Aircraft Company, Culver City, Calif., a corporation of Delaware Filed Oct. 1, 1959, Ser. No. 843,872
10 Claims. (Cl. 328—127)

This invention relates to signal transforming circuits and particularly to an improved circuit for transforming an input signal to an output signal with a predetermined mathematical relationship to provide either amplification or integration.

In the prior art there are many applications where it is desirable that amplifiers and integrators operate accurately and reliably over a wide frequency range from D.C. (direct current) to a selected frequency. For example, in a radar tracking loop the input signal developed from the echo signal varies from D.C. to high frequencies as signal transients and sudden accelerations of the target are sensed by the input signal. The reliability and accuracy of both amplifiers and integrators in a radar tracking loop determine the accuracy of radar tracking.

Conventionally, combination D.C. and A.C. (alternating current) stabilized feedback amplifier systems are limited as to their response characteristics because of their conventional small feedback signal in response to low frequency and D.C. signals. Because of this limited feedback signal, the characteristic curve of amplitude versus frequency is not flat from D.C. to the frequency limit of its operating range, thus not providing reliable and consistent amplification as the frequency of the input signal varies. Conventional feedback amplifier-integrator systems are also limited as to their response characteristics because a very small feedback signal is developed at D.C. This poor response and small feedback signal at D.C. is caused by the deficiencies of the feedback amplifier system used therein. The conventional feedback amplifier system includes an amplifier circuit having a transfer function that by first order approximations is equal to $$\frac{K}{S+a}$$

where K is a gain constant, S is a measure of the frequency of the input signal and $a$ is a finite value at all frequencies indicating the point where the gain declines a certain amount with frequency increase. With this transfer function, an amplifier circuit has limited response characteristics caused by limited feedback at D.C. because the term $a$ remains at a finite value at D.C. and the gain is limited. Thus, the amplification characteristics of the conventional amplifier circuit are not accurate and reliable over a wide frequency range. A conventional feedback amplifier integrator system also utilizes an amplifier circuit having a transfer function that is equal to $$\frac{K}{S+a}$$

thus not providing accurate integration because of the limited feedback in response to a D.C. input signal. An amplifier circuit which has a transfer function whose first order approximations is equal to $$\frac{K}{S}$$

would be capable of providing improved operation in the range where the frequency of the input signal approaches a D.C. signal. This improved amplifier circuit when included in a stabilized amplifier system or a feedback amplifier integrator would provide improved feedback and improved operation over those of the prior art.

It is therefore an object of this invention to provide an amplifier circuit having an amplification function that approaches infinity as the frequency of the input signal decreases to a D.C. signal and which may be utilized to provide an improved stabilized amplifier system and a feedback amplifier-integrator system.

It is a further object of this invention to provide an integrating circuit that has an improved response when integrating low frequency and D.C. input signals.

It is a still further object of this invention to provide a D.C. amplifying circuit that has a high degree of flatness of the gain characteristic over a wide range of frequencies from a D.C. signal to a signal of a predetermined frequency.

It is another object of this invention to provide an amplifier circuit having an improved transfer function by utilizing oscillators and a phase detector.

Briefly, in accordance with this invention, an amplifier circuit is provided that operates with an improved transfer function in either a stabilized feedback amplifier system or a feedback amplifier integrator. The amplifier circuit includes a phase detector responding to the phase of a signal developed by a voltage controlled oscillator relative to a reference signal developed by a fixed reference oscillator. When utilized in a stabilized amplifier system, the voltage controlled oscillator receives an input signal from an input terminal through a first resistor and receives a feedback signal through a second resistor from the output terminal of the phase detector. When the amplifier circuit is utilized in a feedback amplifier integrator system, the configuration is similar except that the input terminal of the voltage controlled oscillator receives the feedback signal from the output terminal of the phase detector through a capacitive element rather than a second resistor. The improved transfer function of the amplifier circuit causes the amplifier system to have infinite gain in response to a D.C. input signal and causes the amplifier integrator system to have a relatively large feedback in response to a D.C. or low frequency input signal so as to provide highly reliable integration over a wide frequency range.

The novel feature of this invention, as well as the invention itself, both as to its organization and method of operation, will be best understood from the following description taken in conjunction with the accompanying drawings, in which like reference characters refer to like parts, and in which.

Figure 1:
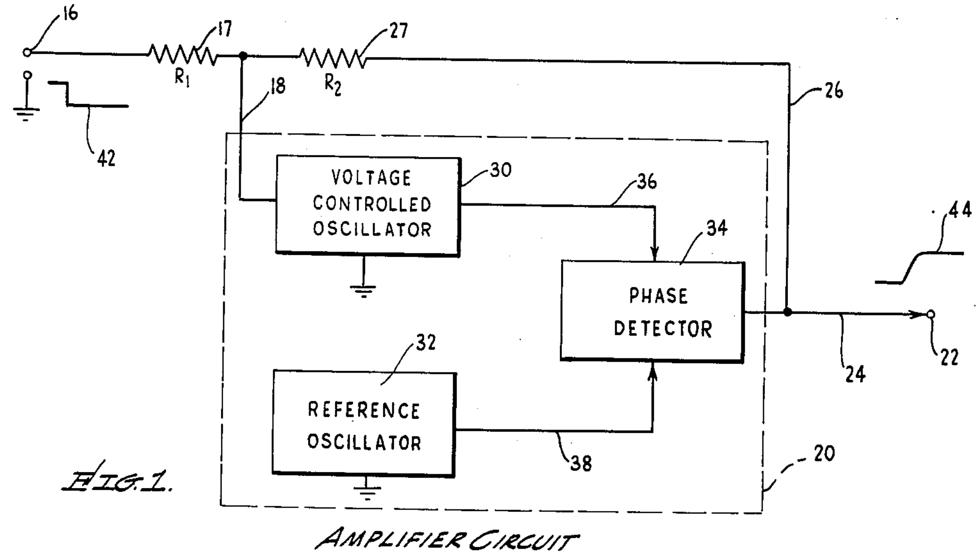
FIG. 1 is a combination block and circuit diagram of the stabilized feedback amplifier system in accordance with this invention.

Referring first to FIG. 1 which shows a block and circuit diagram of the stabilized D.C. amplifier system in accordance with this invention, the arrangement of the elements will be explained. The system receives an input signal at an input terminal 16, which is applied through a resistor 17, also indicated as $R_1$, and through a lead 18 to an amplifier circuit 20 that is provided as the feedback amplifier circuit of the system. An output signal is developed by the amplifier circuit 20 and applied to an output terminal 22 through an output lead 24. The output signal at the lead 24 is also applied as a feedback signal through a lead 26, a resistor 27, also indicated as a resistor $R_2$, to the lead 18.

The amplifier circuit 20 includes a voltage controlled oscillator (VCO) 30 responsive to the signal at the lead 18, and a reference oscillator 32. A phase detector 34 is adapted to be responsive to the phase of a reference signal applied through a lead 36 from the reference oscillator 32 and to a signal developed by the voltage controlled oscillator 30 and applied thereto from the reference oscillator 32 through a lead 38. The output signal developed by the phase detector 34 is applied to the output lead 24. Input and output signals having instantaneous changes in voltage level are shown by respective waveforms 42 and 44.

The voltage controlled oscillator 30 may be any conventional tuning oscillator, such as one utilizing reactance tubes, voltage controllable semiconductor reactance elements, or saturable reactors. The reference oscillator 32 may be any conventional oscillator such as a crystal controlled oscillator tuned to a selected frequency. Also, the phase detector 34 may be any conventional phase detector circuit.

Figure 2:
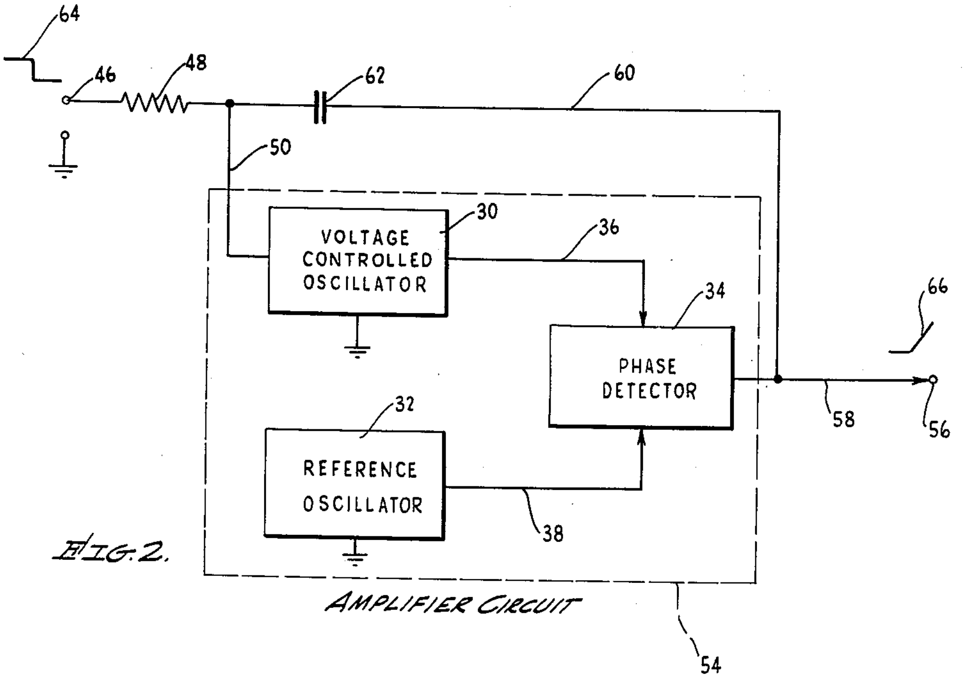
FIG. 2 is a combination block and circuit diagram of the feedback amplifier integrator system in accordance with this invention.

Referring now to FIG. 2 which shows a block and circuit diagram of the feedback amplifier integrator system in accordance with this invention, the arrangement of the elements of this system will be explained.

An input signal to be integrated is applied to an input terminal 46 and through a resistor 48 and a lead 50 to an amplifier circuit 54, which is similar to the amplifier circuit 20 of FIG. 1, and including the voltage controlled oscillator 30, the reference oscillator 32, and the phase detector 34. An output signal is applied from the phase detector 34 to an output terminal 56 through an output lead 58. The output signal is also applied as a feedback signal through a lead 60 and a capacitor 62 to the lead 50. An input signal applied to the terminal 46 is shown by a waveform 64 and an output signal available at the terminal 56 is shown by a waveform 66. Thus, the amplifier integrator system of FIG. 2 is similar to the stabilized amplifier system of FIG. 1 in configuration except that the resistor 27 is replaced by the capacitor 62 in the integrator system.

Referring now to FIGS. 1 and 2, the general operation of the system in accordance with this invention will be explained. The alternating signals developed by the voltage controlled oscillator 30 and the reference oscillator 32 are normally at the same frequency in response to a zero level input voltage applied to the VCO 30 when either the amplifier or integrator system is stabilized by a feedback signal. When the signals on the leads 36 and 38 are at the same frequency, the phase detector 34 develops at D.C. output signal indicative of their phase relation. It is to be noted that the reference oscillator 32 develops a reference signal, which is always at a fixed frequency. In response to a change in amplitude of the input voltage applied to the terminals 16 or 46 and to the voltage controlled oscillator 30, the oscillating signal developed on the lead 36 either increases or decreases in frequency. The phase detector 30 responds to the signals on the leads 36 and 38, when they are either instantaneously or steadily at the same frequency, to develop a D.C. output signal. When the signals on the leads 36 and 38 are 90 degrees out of phase from each other, a zero volt output is applied to the lead 24, when the signals are in phase a positive D.C. output signal is developed at the lead 24, and when the signals are 180 degrees out of phase from each other a negative D.C. output signal is developed at the output lead 24.

In response to a change in amplitude of the input voltage applied to the input terminal 16 or 46, the voltage controlled oscillator 30 changes to a new frequency of oscillation and the phase detector 34 carries out a mixing or heterodyning operation as is well known in the art. A signal that has the form of a sine wave starts to develop at the difference frequency of the two signals applied to the phase detector 34, and this difference frequency signal is applied to the output leads 24 or 58.

The first portion of this sine wave is fed back as a negative feedback signal through the leads 26 or 60 to be combined with the input signal. The portion of a sine wave rises or falls to a selected level as determined by the voltage dividing characteristics of the feedback circuit, until it is equal and opposite to the input signal in the amplifier system of FIG. 1. In the integrator system of FIG. 2, the portion of a sine wave also rises to a certain level opposite to the level of the input signal but continues to rise with time as the capacitor 62 continues to charge. The input signal to the voltage controlled oscillator 30 is thus returned to its zero voltage level and the signal at the lead 36 returns to the same frequency as the reference signal at the lead 38.

When the VCO 30 changes frequency relative to the reference signal in the lead 38, the phase relative to the reference signal at the lead 38 begins to change. As the VCO 30 and the reference oscillator 32 return to the same frequency, the phase relation which exists at the instant that the negative feedback equalled the input signals is maintained and the corresponding D.C. level of the signal on the output leads 24 is established and maintained, and on the output lead 58 continues to rise with time as in a conventional integrator. In the integrator system of FIG. 2, a voltage on the lead 58 resulting from an infinitesimal phase difference sensed by the phase detector 34 is continually being integrated. The D.C. signal level at the terminals 22 or 56 is either the amplified or integrated voltage value of the input signal.

For example, an increase of frequency of the VCO 30 resulting from a rise of voltage level of the input signal increases the difference frequency and increases the phase difference of the signals applied to the phase detector 34, thus decreasing the voltage level of the D.C. output signal on the leads 24 or 58. A decrease of voltage level of the input signal increases the difference frequency in the opposite direction from a rise of input voltage and decreases the phase difference between the signals applied to the phase detector 34, thus increasing the level of the D.C. output signal at the lead 24 or 58.

In the amplifier system of FIG. 1, a fall of potential at the input terminal 16, as shown by the waveform 42, causes an increase of potential at the output terminal 22, as shown by the waveform 44. In a similar manner in the integrator system of FIG. 2, a fall of potential at the input terminal 46, as shown by the waveform 64, causes a rise of potential at the output lead 56, as shown by the waveform 66. It is to be noted that the signals of the waveforms 42 and 64 show an instantaneous change of voltage level of the input signals, while the input signals may be any signal. However, regardless of the waveshapes of the input signal, the systems of FIGS. 1 and 2 operate instantaneously in a similar manner to that discussed above to maintain the signals developed by the VCO 30 and the reference oscillator 32 at the same frequency with their relative phase changing to vary the voltage level of the output signal at the output leads 22 and 56. It is to be noted that the polarity relations of the voltages discussed above are only an example of those that may be utilized, and opposite directions of voltage changes of the input signal may cause the same changes of the levels of the output signals.

Figure 3:
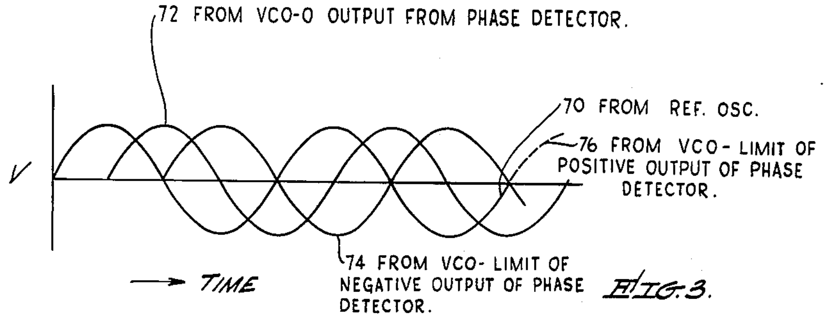
FIG. 3 is a diagram of voltage versus time showing the signals developed by the voltage controlled oscillator and reference oscillator of FIGS. 1 and 2.

Referring now to FIG. 3 which shows the signals applied to the phase detector 34, as well as referring to FIGS. 1 and 2, the operation of the amplifier and integrator systems will be further explained. The signal developed by the reference oscillator 32 is shown as a waveform 70. The signal developed by the VCO 30 which is in a condition 90 degrees out of phase from the reference signal to develop a zero voltage level by the phase detector 34 is shown by a waveform 72. A signal shown by a waveform 74 indicates the condition when the VCO 30 develops a signal which is 180 degrees out of phase from the reference signal, this condition being the limit of the negative output of the phase detector 34 and is established by the characteristics of the phase detector 34. Also, a waveform 76 is shown with dotted lines to indicate the condition when the signal developed by the VCO 30 is in phase with the reference signal on the lead 38, this condition providing the upper level of the output voltage. It is to be noted that these phase relations and output voltages are only given as an example of operation of this invention, and the phase detector 34 may be selected to operate in a similar but opposite manner.

Figure 4:
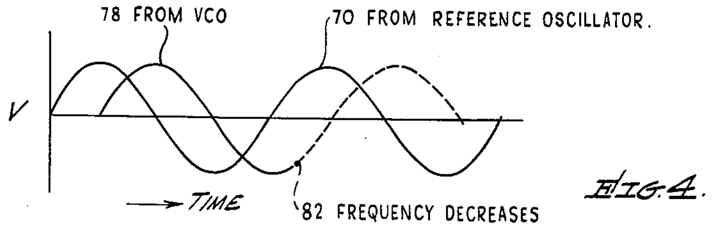
FIG. 4 is a diagram of voltage versus time showing the instantaneous changes in frequency and phase of the signals developed by the voltage controlled oscillator relative to the reference oscillator for explaining the systems of FIGS. 1 and 2.

Referring now to FIG. 4 which shows the instantaneous frequency change of the VCO 30 in response to a voltage change of the input signal, as well as referring to FIGS. 1 and 2, the phase change of the signal developed by the VCO 30 will be further explained. During the first time portion of FIG. 4, the reference signal as shown by the waveform 70 has a fixed phase relation with the signal developed by the VCO 30 as shown by a waveform 78. The waveform 78 is shown 90 degrees out of phase from the reference signal of the waveform 70 to indicate a condition when the input and output signals are both at a zero voltage level. However, the operation as will be subsequently discussed is similar at any phase relation between the initial time portions of the waveforms 70 and 78 indicating an initially different instantaneous voltage level of the input signal at the terminals 16 and 46 and of the output signal at the terminals 22 or 56. For purposes of explanation, at a point 82 of the waveform 78, it will be assumed that in response to a decrease of input voltage applied to the terminal 16 or 46, the frequency of the signal developed by the VCO 30 at the lead 36 decreases. Thus, the phase at any instant of time of the waveform 78 starts to decrease relative to the reference signal of the waveform 70 because the waveform 78 is oscillating at a lower frequency. The waveform 78 oscillates at the lower frequency and with a relative phase shift until a negative feedback restores the signal of the waveform 78 to the frequency of the signal of the waveform 70, as will be discussed subsequently.

Figure 5:
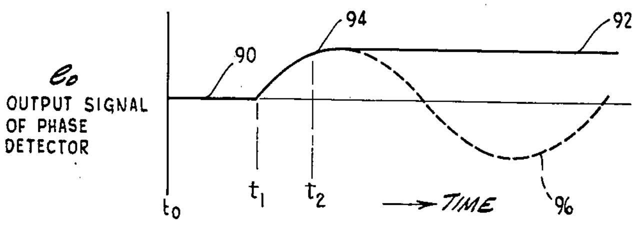
FIG. 5 is a diagram of voltage versus time for explaining the output signal developed by the phase detector of FIGS. 1 and 2.
Figure 6:
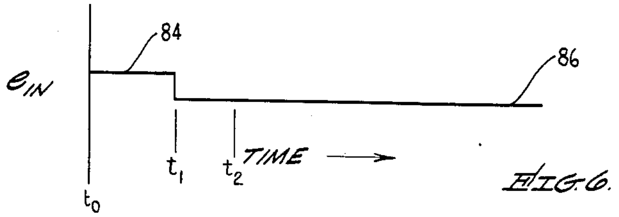
FIG. 6 is a diagram of voltage versus time showing a variation of the input voltage applied to the voltage controlled oscillator of FIGS. 1 and 2.

Referring now to FIG. 5 which shows the instantaneous output voltage $e_0$ of the phase detector 30 and to FIG. 6 which shows an instantaneous change of input voltage $e_{IN}$ applied to the input terminals 16 or 46, as well as referring to FIGS. 1 and 2, the negative feedback operation of the systems in accordance with this invention will be further explained. Between times $t_0$ and $t_1$, the input voltage $e_{IN}$ is shown by a voltage level 84 of a waveform 86 and the output voltage $e_0$ of the phase detector 34 is shown by a voltage level 90 of a waveform 92. At time $t_1$, the voltage $e_{IN}$ applied to the input terminals 16 or 46 falls to a lower level and the signal developed by the VCO 30 decreases in frequency, as indicated at the point 82 of FIG. 4. Thus, the phase detector 34 operates as a mixer and a sine wave indicating the difference frequency between the reference signal and the signal developed by the VCO 30 starts to be developed. This signal indicating the difference frequency or envelope frequency is shown by a rising portion 94 of the waveform 92 and by a dotted waveform 96.

At time $t_1$, the difference frequency signal as shown by the rising portion 94 increases and is fed back as a negative feedback signal from the output lead 24 to the lead 18 or from the output lead 58 to the lead 50. At time $t_2$, the voltage of the rising portion 94 increases to a level so as to overcome the decrease of voltage of the waveform 86 from its zero voltage level, the required amount of voltage rise of the waveform 92 being determined by the voltage dividing characteristics of the resistors 17 and 27 or the resistor 48 and the capacitor 62. Thus, at time $t_2$, the voltage applied to the VCO 30 has been overcome by the negative feedback signal so that the VCO 30 returns to its initial frequency of oscillation which is the same as the frequency of the reference signal developed by the reference oscillator 32. Because the signal developed by the VCO 30 returns to the same frequency as the reference signal, the signal developed by the VCO 30 retains that instantaneous phase condition, which it has at time $t_2$. Thus, the time between times $t_1$ and $t_2$ determines the phase of the signal developed by the VCO 30 after the frequencies again become common. The slope of the difference frequency sine wave, as shown by the rising portion 94, determines the time during which the phase of the signal developed by the VCO 30 shifts when the frequency of the two signals applied to the phase detector 34 is different. The amount of rise of the waveform 92 before the frequency of the signal developed by the VCO 30 is returned to that of the reference signal is determined by the feedback loop and is selected to be before the peak of the waveform 96 is reached. The change of voltage level between the waveform 86 and the waveform 92 is the amplification of the stabilized D.C. amplifier system of FIG. 1 and is the amplification to give an integral output of the amplifier integrator system of FIG. 2. As discussed above, in the integrator system of FIG. 2, the rising portion 94 continues to rise with time rather than remaining at one level as in the amplifier system of FIG. 1. It is to be noted that a rise of potential of the input signal of the waveform 86 causes the output signal to fall in the opposite direction of the rising portion 94 of the waveform 92 so that there is always a 180 degree phase reversal between the input signal applied to the input terminal 16 or 46 and received at the output terminal 22 or 56. The above operation which is explained for one single voltage change of the input signal continuously takes place with both the amplifier and the integrator systems in response to a continually alternating input signal applied to the input terminals 16 or 46.

The slope of the rising portion 94 of the sine wave indicating the difference frequency of the signals applied to the phase detector 34 is proportional to the phase condition retained by the signal developed by the VCO 30 and thus proportional to the voltage level of the output signal. The greater the amplitude of any decrease of the input voltage, the greater is the decrease of frequency of the signal developed by the VCO 30 and the longer is required for the rising portion 94 to increase to its required level, thus providing a greater phase decrease. The greater is the phase decrease, the higher is the amplitude of the stabilized level of the output signal of the waveform 92 developed by the systems at time $t_2$. The response is similar but opposite for any fall of potential of the input signal applied to the input terminals 16 or 46.

Before further explaining the characteristics of the systems of this invention, the improved transfer characteristics of the amplifier circuits 20 and 54 of FIGS. 1 and 2 will be further explained. As is well known in the art, a conventional amplifier circuit has an over-all gain transfer characteristic which is equal to $$\frac{K}{S+a}$$

where:

$K$=A scale factor or gain constant, which is a measure of the absolute gain of the amplifier circuit.
$S=J2\pi f$, where $f$ is the frequency of the input signal and J is the $\sqrt{-1}$ operator.
$a$=A function of the frequency response of the amplifier, which is always a finite amount in a conventional amplifier.

However, this type of amplifier circuit does not have desirable gain characteristics at low frequencies. With this transfer function, as the frequency decreases to a D.C. signal, S is zero and the transfer function still has a finite value as determined by $a$. Thus, the gain of the conventional amplifier circuit does not approach infinity in response to a D.C. input signal, which condition limits the feedback energy in stabilized amplifier systems and amplifier integrator systems.

The amplifier circuits 20 and 54 in accordance with this invention have an over-all transfer function which is equal to $$\frac{K}{S}$$

When the two oscillators 30 and 32 differ in frequency, their phase difference increases linearly with time because phase is the time integral of frequency difference. Therefore, applying the two signals from the VCO 30 and the reference oscillator 32 to the phase detector 34 develops an integral of voltage with time which may be described analytically as $$\frac{K}{S}$$

The gain constant K in the amplifier circuit of this invention is the ratio of the slope of the rise or fall of the difference frequency of the sine wave to the input voltage and is determined by the transfer gain of the VCO 30 and the gain of the phase detector 34.

To show that the improved transfer function provides infinite gain at D.C., the gain equation is:

$$\frac{E_o}{E_{IN}}=\frac{AZ_2}{Z_1+Z_2-AZ_1}$$

where $E_o$=amplitude of the output voltage
$E_{IN}$=amplitude of the input voltage
$A$=amplifier circuit transfer response
$Z_1$=impedance value of the resistors 17 or 48
$Z_2$=impedance value of the resistor 27 or the capacitor 62

Then $$\frac{E_o}{E_{IN}}=-\frac{Z_2}{Z_1}+\epsilon$$

where $$\epsilon=\frac{-\frac{1}{A}(Z_1Z_2+Z_2^2)}{Z_1-\frac{1}{A}(Z_1^2+Z_1Z_2)}$$

and is an error term.

If $$A=\frac{K}{S+a}$$

as in the conventional amplifier circuit, then $$E=\frac{\frac{S+a}{K}(Z_1Z_2+Z_2^2)}{Z_1^2-\left(\frac{S+a}{K}\right)(Z_1Z_2+Z_1^2)}$$

In this case as $S\rightarrow 0$, $\epsilon$ has a finite value which does not go to zero.

If $$A=\frac{K}{S}$$

as in the amplifier circuits 20 and 54, $\epsilon$ does go to zero as $S\rightarrow 0$ and the gain $$\frac{E_o}{E_{IN}}$$

is precisely equal to $$-\frac{Z_2}{Z_1}$$

in response to $E_{IN}$ as a D.C. input signal. Therefore, the amplifier circuits 20 and 54 have an improved transfer function and behave like a system with infinite gain in the amplifier circuits 20 and 54.

Figure 7:
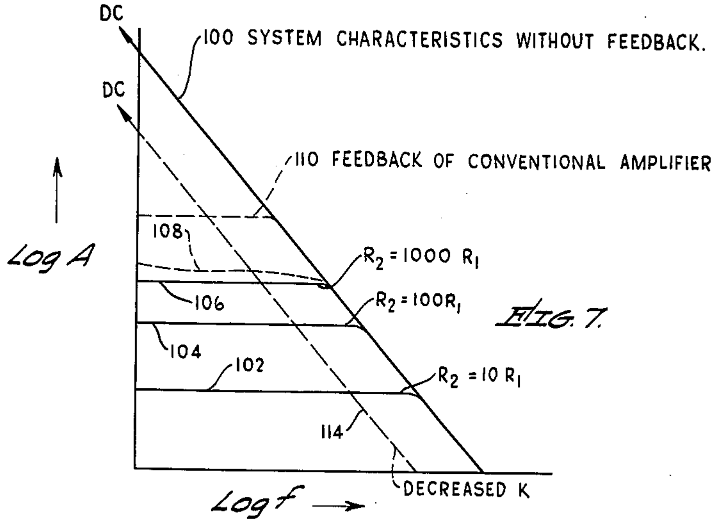
FIG. 7 is a diagram of the logarithm of gain versus the logarithm of frequency for explaining the characteristics of the feedback amplifier system of FIG. 1.

Referring now to FIG. 7 which is a graph showing the logarithm of gain A versus the logarithm of frequency $f$ of the feedback amplifier system of FIG. 1, the operation will be further explained. A curve 100 shows the characteristics of the amplifier circuit 20 without the feedback connections. As the frequency of the input signal which is assumed to be a sine wave, decreased to a D.C. signal, the gain A of the amplifier circuit 20 becomes infinite. A curve 102 shows the operating region of the amplifier system for a selected feedback divider circuit where the value of the resistor $R_2$ is equal to 10 times the value of the resistor $R_1$. Also, a curve 104 shows the operating region of the amplifier system when the value of the resistor $R_2$ is equal to 100 times the value of the resistor $R_1$ and a curve 106 is shown when the value of the resistor $R_2$ is equal to 100 times the value of the resistor $R_1$. At increased frequencies, the curves 102, 104 and 106 follow the curve 100 to depress the gain to provide the characteristic attenuation of undesired high frequency signals which characteristic is useful in many applications such as in radar tracking loops. Because of the improved transfer characteristic of the amplifier circuit 20 so as to provide a large feedback at low frequencies, the curves 102, 104 and 106 have a high degree of flatness, that is the gain is constant over the entire frequency range. A curve 108, shown dotted, indicates the operating curve of a conventional feedback amplifier system. The curve 108 of the conventional system varies in gain with frequency because of the limited feedback energy indicated by a curve 110. For applicants' system the feedback energy is very high at low frequencies, being indicated by the area between the curves 102, 104 and 106 and the curve 100. Applicants' system is also flexible in that a K can be selected to give any desired characteristic curve as indicated by a dotted curve 114 for a decreased value of K.

Figure 8:
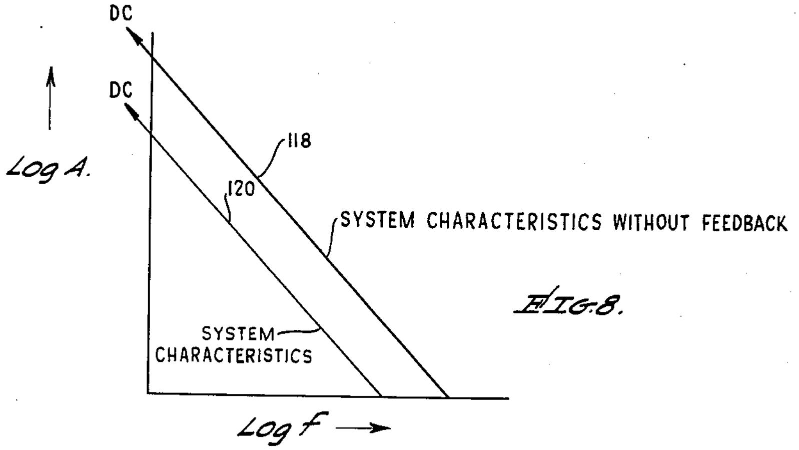
FIG. 8 is a graph of the logarithm of gain versus the logarithm of frequency for explaining the system characteristics of the amplifier integrator system of FIG. 2.
Figure 9:
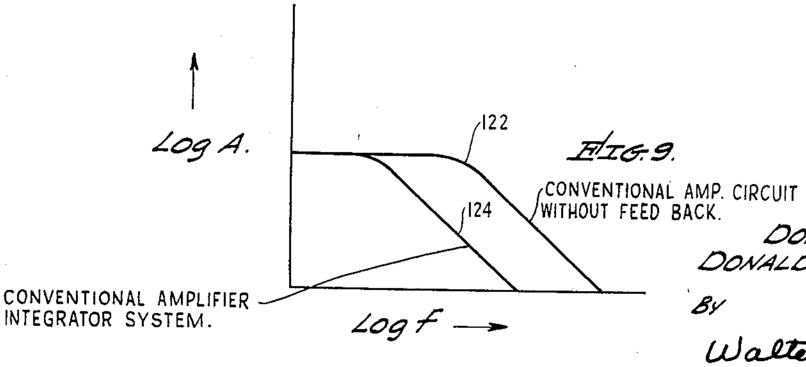
FIG. 9 is a diagram of the logarithm of gain versus the logarithm of frequency of a conventional integrator system for explaining the advantages of the integrator system of FIG. 2.

Referring now to FIG. 8 which is a diagram showing the logarithm of gain versus the logarithm of frequency for the amplifier integration system in accordance with this invention and referring to FIG. 9 which shows the logarithm of gain versus frequency for a conventional amplifier integrater, as well as referring to FIG. 2, the operation of the integration system will be further explained. The graph of FIG. 8 shows the characteristics for a sine wave as an input signal, but similar characteristics would be obtained for any input signal. A curve 118 shows the characteristics of the system for the amplifier circuit 54 without the feedback connection through the capacitor 62 and a curve 120 shows the system operation for the integration system of FIG. 2. It is to be noted that the gain of both the curves 118 and 120 become infinite in response to a D.C. input signal. The feedback energy which is indicated by the area between the curves 118 and 120 is constant at all frequencies of operation.

The integrator system of FIG. 2 which operates similar to a Miller integrator system provides a current through the lead 60 to the capacitor 62, which current as well as a current from the input terminal 46 and a constant potential at the lead 50 determines the charging time of the capacitor 62 and the output voltage which is the integral of the input voltage. Thus, the integrator system provides a reliable and accurate integral because the voltage developed by the capacitor 62 does not fall off with time because of a decreasing current supplied thereto. The curve 120 of FIG. 8 moves further away from the curve 118 by increasing the resistor 48 or the capacitor 62 of the system. Also decreasing the value of K moves the curve 118 in the same direction as for the characteristics of the amplifier system indicated in FIG. 7.

A curve 122 of FIG. 9 shows the characteristics of an amplifier circuit of a conventional amplifier integrator system and a curve 124 shows the operating characteristics of the conventional amplifier integrator system. At low frequencies, the conventional system has no feedback and the integral developed thereby is not accurate at low frequencies as in applicants' system where the gain constantly increases as the frequency of the input signal decreases to a D.C. signal.

Thus, there has been described an improved feedback amplifier system and amplifier integrator system that has improved operation over a wide range of frequency variation of the input signal because of the high gain characteristics when the input signal has a low frequency. The systems utilize an amplifier circuit that has an improved transfer function to provide infinite gain in response to a D.C. input signal. The amplifier system utilizing this amplifier circuit has a flat response characteristic with frequency and the amplifier integration system has improved accuracy and reliability of integration.

What is claimed is:

1. A circuit for transforming an input voltage from an input source to an output voltage with a predetermined mathematical relation comprising a voltage controlled oscillator having an input terminal for receiving the input voltage, a first impedance means coupled between said input source and the input terminal of said voltage controlled oscillator, a reference oscillator, a phase detector coupled to said voltage controlled oscillator and to said reference oscillator and having an output terminal for developing the output voltage thereat, and feedback means including a second impedance means coupled between said output terminal and said input terminal for determining the mathematical relation for transforming said input voltage to said output voltage.

2. A signal transforming circuit comprising a reference oscillator for developing a signal at a first frequency, a resistor coupled to an input terminal, a voltage controlled oscillator coupled to said resistor for responding to an input signal to develop signals over a band of frequencies including said first frequency, said signal developed by said voltage controlled oscillator when at a frequency other than said first frequency continually changing in phase relative to the signal developed by said reference oscillator, a phase detector coupled to said voltage controlled oscillator and said reference oscillator to develop an output signal indicative of the phase of the signal developed by said voltage controlled oscillator, and feedback means coupled between said phase detector and said resistor to control said voltage controlled oscillator when developing a signal other than said first frequency so as to develop a signal at said first frequency, thereby controlling the phase of the signal developed by said voltage controlled oscillator and forming said output signal.

3. A circuit for transforming an input signal received from an input terminal to an output signal applied to an output terminal with a predetermined mathematical relation comprising a voltage controlled oscillator coupled to the input terminal, a reference oscillator, phase detector means coupled between said voltage controlled oscillator and said reference oscillator and to the output terminal, a first impedance means coupled between said input terminal and said voltage controlled oscillator, and second impedance means coupled between said output terminal and said voltage controlled oscillator, said first and second impedance means determining the mathematical relation between said input signal and said output signal.

4. A voltage modifying circuit comprising a signal source, first impedance means coupled to said signal source, a voltage controlled oscillator coupled to said first impedance means to develop a first signal over a band of frequencies including a first frequency, a reference oscillator for developing a second signal at said first frequency, a phase detector coupled to said voltage controlled oscillator and said reference oscillator for developing a D.C. signal indicative of the phase relation of said first and second signals when at said first frequency and for developing a difference signal when said first signal is at a frequency other than said first frequency and said second signal is at said first frequency, and second impedance means coupled between said phase detector and said first impedance means for feeding back said difference signal to said voltage controlled oscillator when said first signal changes to a frequency other than said first frequency to overcome a voltage change at said signal source and to return the first signal to said first frequency and with a phase proportional to the time duration of said difference signal.

5. A voltage modifying circuit for changing the level of an applied input voltage in a predetermined manner comprising an input circuit, a voltage controlled oscillator, a reference oscillator, phase detecting means coupled to said voltage controlled oscillator and said reference oscillator to develop an output voltage, an output circuit coupled to said phase detecting means, and a voltage dividing means coupled between said output circuit and said input circuit and to said voltage controlled oscillator for controlling said voltage controlled oscillator so said output voltage changes in level in response to the applied input voltage in the predetermined manner.

6. A stabilized amplifier system for amplifying an input signal to develop an output signal with a selected amount of amplification comprising input signal means, a first resistor having one end coupled to said input signal means, a variable oscillator coupled to the other end of said first resistor, a reference oscillator, a phase detector coupled to said variable oscillator and said reference oscillator, output circuit means coupled to said phase detector, and means including a second resistor coupled between said output circuit and the end of said first resistor coupled to said variable oscillator for varying the frequency thereof, said first and second resistors having relative resistive values for determining the selected amount of amplification of said system.

7. An amplifier circuit for use in a feedback signal modifying circuit having an inverse feedback means, said amplifier circuit comprising input circuit means for developing an input signal, a resistor coupled to said input circuit means, a reference oscillator for developing a signal at a common frequency, a voltage controlled oscillator coupled to said resistor and to the feedback means, said voltage controlled oscillator developing a signal over a band of frequencies including said common frequency, said signal being at said common frequency when the signal applied thereto from said feedback means is equal and opposite to said input signal, a phase detector coupled to said voltage controlled oscillator and to said reference oscillator to develop a first output signal when said voltage controlled oscillator develops a signal at said common frequency and to develop a second output signal when said voltage controlled oscillator develops a signal at a frequency other than said common frequency, and output circuit means coupled to said phase detector and to said inverse feedback means, whereby a change of the voltage applied to said voltage controlled oscillator from said input circuit means changes the frequency thereof from said common frequency so said phase detector develops a second output signal which is fed back through said inverse feedback means to control said voltage controlled oscillator and said phase detector to develop said first output signal.

8. An amplifier system comprising input circuit means, a first resistor having one end coupled to said input circuit means, a voltage controlled oscillator for developing a first signal over a band of frequencies including a first frequency, a reference oscillator for continually developing a second signal at said first frequency, a phase detector coupled to said voltage controlled oscillator and to said reference oscillator for developing a direct current output signal when said first and second signals are at said first frequency and for developing a difference signal when said first signal is at a frequency different than said first frequency, output circuit means coupled to said phase detector, and a second resistor coupled between said output circuit means and the end of said first resistor coupled to said voltage controlled oscillator, whereby the input signal controls said voltage controlled oscillator to change the frequency of said first signal and change the phase relative to the phase of said second signal so said phase detector develops a difference signal which is fed back to overcome said input signal so as to return said voltage controlled oscillator to said first frequency with said first signal having a phase which causes said phase detector to develop said direct current output signal.

9. An amplifier integrator system for varying an input signal to develop an output signal which is the integral of the input signal, comprising input signal means, a first resistor having one end coupled to said input signal means, a variable oscillator coupled to the other end of said first resistor, a reference oscillator, a phase detector coupled to said variable oscillator and said reference oscillator, output circuit means coupled to said phase detector, and means including a capacitor coupled between said output circuit means and the end of said first resistor coupled to said variable oscillator for varying the frequency thereof.

10. An integrator system comprising input circuit means, a resistor having one end coupled to said input circuit means, a voltage controlled oscillator for responding to an input signal to develop first signal at a band of frequencies including a first frequency, a reference oscillator for continually developing a second signal at said first frequency, a phase detector coupled to said voltage controlled oscillator and to said reference oscillator for developing a direct current output signal when said first and second signals are at said first frequency and for developing a difference signal when said first signal is at a frequency other than said first frequency, output circuit means coupled to said phase detector, a capacitor coupled between said output circuit means and the end of said resistor coupled to said voltage controlled oscillator, whereby a change of level of the input signal changes the frequency of said first signal so said phase detector develops said difference signal which is fed back to overcome said change of level of input signal so as to return said voltage controlled oscillator to said first frequency, said direct current output signal from said phase detector being the integral of said input signal.

References Cited in the file of this patent

UNITED STATES PATENTS

| | | |
|---|---|---|
| 2,279,660 | Crosby | Apr. 14, 1942 |
| 2,558,100 | Rambo | June 26, 1951 |
| 2,774,872 | Howson | Dec. 18, 1956 |
| 2,871,349 | Shapiro | Jan. 27, 1959 |
| 2,968,769 | Johnson | Jan. 17, 1961 |

OTHER REFERENCES

Article, "Phase Shifting Amplifier," by French, IBM Technical Disclosure Bulletin, vol. 2, No. 4, December 1959.